US012493818B2

(12) United States Patent
Riccitiello et al.

(10) Patent No.: US 12,493,818 B2
(45) Date of Patent: Dec. 9, 2025

(54) METHOD AND SYSTEM FOR GENERATING VARIABLE TRAINING DATA FOR ARTIFICIAL INTELLIGENCE SYSTEMS

(71) Applicant: Unity Technologies ApS, Copenhagen (DK)

(72) Inventors: John Salvatore Riccitiello, San Francisco, CA (US); Sylvio Herve Drouin, San Francisco, CA (US)

(73) Assignee: Unity Technologies ApS, Copenhagen (DK)

( * ) Notice: Subject to any disclaimer, the term of this patent is extended or adjusted under 35 U.S.C. 154(b) by 1274 days.

(21) Appl. No.: 17/150,767

(22) Filed: Jan. 15, 2021

(65) Prior Publication Data

US 2021/0224691 A1 Jul. 22, 2021

Related U.S. Application Data

(60) Provisional application No. 62/962,637, filed on Jan. 17, 2020.

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | | |
|---|---|---|---|---|
| 10,191,116 | B2* | 1/2019 | Aliyev | G01R 31/3865 |
| 11,341,370 | B2* | 5/2022 | Ji | G06Q 50/04 |
| 11,562,828 | B2* | 1/2023 | Neumann | G16H 20/00 |
| 2015/0201077 | A1* | 7/2015 | Konig | G06Q 30/0281 |
| | | | | 379/265.07 |
| 2018/0268258 | A1* | 9/2018 | Tapia | G06F 18/217 |
| 2019/0286986 | A1* | 9/2019 | Bin | G06N 3/04 |
| 2020/0104706 | A1* | 4/2020 | Sandler | G06N 3/045 |
| 2020/0125944 | A1* | 4/2020 | Jauhar | G06F 40/40 |
| 2020/0167690 | A1* | 5/2020 | Zhao | G06N 3/084 |
| 2020/0202199 | A1* | 6/2020 | Lee | G06N 3/0464 |
| 2020/0349464 | A1* | 11/2020 | Lin | G06N 3/084 |

(Continued)

OTHER PUBLICATIONS

Peng et al. (NPL, "Multi-task Domain Adaptation for Sequence Tagging", 2017) (Year: 2017).*

*Primary Examiner* — Imad Kassim
(74) *Attorney, Agent, or Firm* — Schwegman Lundberg & Woessner, P.A.

(57) ABSTRACT

An artificial intelligence (AI) training method is disclosed. Training data associated with a training task is received. The training data is categorized into a plurality of categories. A set of category groups are generated, wherein each category group of the set of category groups includes one or more of the plurality of categories. A first AI system is trained for the training task using a first subset of the training data. The first subset of the training data corresponds to the one or more of the plurality of categories included in a first group of the set of category groups. A second AI system is trained for the training task using a second subset of the training data. The first AI system is used to generate a first output for the task and the second AI system to generate a second output for the task.

17 Claims, 5 Drawing Sheets

(56) References Cited

U.S. PATENT DOCUMENTS

2020/0394451 A1* 12/2020 Baijal .................. G06N 3/08
2021/0264271 A1*  8/2021 Gebre .................. G06N 3/082
2022/0358313 A1* 11/2022 Kobayashi ............ G06N 3/08
2024/0412103 A1* 12/2024 Subber .................. G16H 50/20

* cited by examiner

METHOD AND SYSTEM FOR GENERATING VARIABLE TRAINING DATA FOR ARTIFICIAL INTELLIGENCE SYSTEMS

CROSS-REFERENCE TO RELATED APPLICATIONS

This application claims the benefit of U.S. Provisional Application No. 62/962,637, filed Jan. 17, 2020, entitled "METHOD AND SYSTEM FOR GENERATING VARIABLE TRAINING DATA FOR ARTIFICIAL INTELLIGENCE SYSTEMS," which is incorporated by reference herein in its entirety.

TECHNICAL FIELD

The subject matter disclosed herein generally relates to the technical field of artificial intelligence, and in one specific example, to systems and methods for training artificial intelligence systems.

BACKGROUND OF THE INVENTION

There are many potential uses for AI in content creation, business management, and other fields where AI algorithms are trained on large data-sets and where users of the trained algorithm are presented with a "black box" solution. The user of an AI algorithm (e.g., developers, designers, marketing specialists, business people, etc.) often has no control of the training process for the AI and may not want more control than a black box solution can provide. For example, an artist may input a semantic description of a desired outcome to a trained AI (e.g., a living room, a forest, a river), and receive as output a specific river, room or forest without any control over the output. There is often a mistrust of black box solutions and many users would prefer greater insights into factors (e.g., training data and training methods) that result in a particular AI training outcome.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1A:
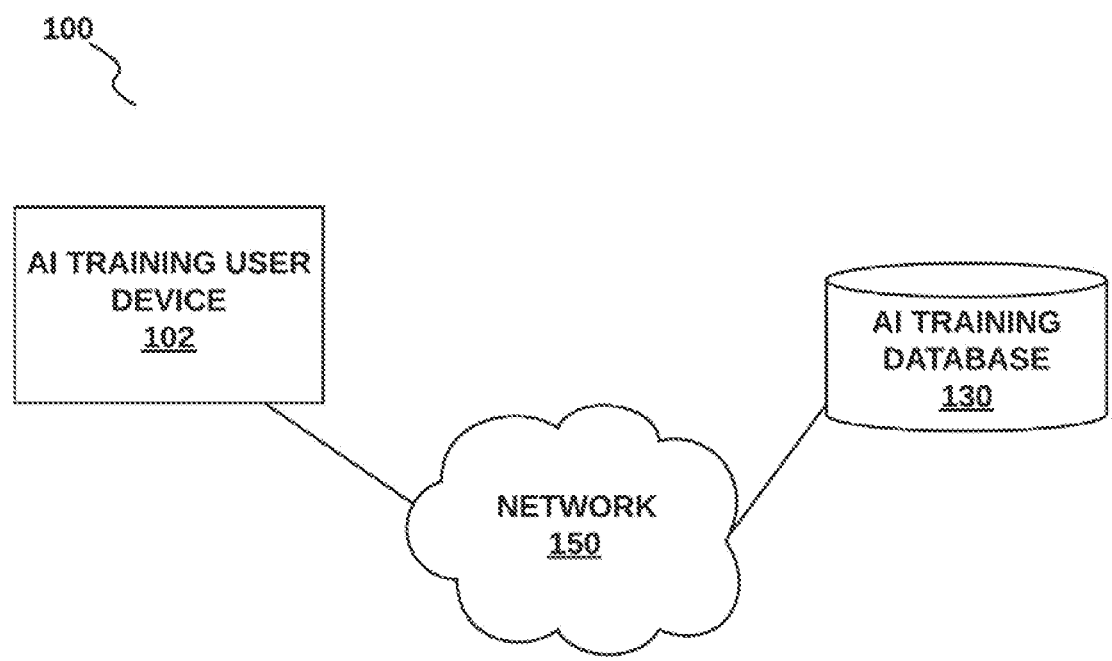
FIG. 1A is a schematic illustrating an AI training system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A digital object is associated with data that defines properties and behavior for the object.

The terms 'asset', 'game asset', and 'digital asset', used throughout the description herein are understood to include any data that can be used to describe a digital object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The terms 'client' and 'application client' used throughout the description herein are understood to include a software client or software application that can access data and services on a server, including accessing over a network.

Throughout the description herein, the term "agent" and "AI agent" should be understood to include entities such as a non-player character (NPC), a robot, and a game world which are controlled by an artificial intelligence system or model.

An artificial intelligence (AI) training method is disclosed. Training data associated with a training task is received. The training data is categorized into a plurality of categories. A set of category groups are generated. Each category group of the set of category groups includes one or more of the plurality of categories. A first AI system is trained for the training task. The training of the first AI system includes using a first subset of the training data. The first subset of the training data corresponds to the one or more of the plurality of categories included in a first category group of the set of category groups. A second AI system is trained for the training task. The training of the second AI system includes using a second subset of the training data. The second subset of the training data corresponds to the one or more of the plurality of categories included in a second category group of the set of category groups. The first AI system is used to generate a first output for the task and the second AI system to generate a second output for the task.

The present invention includes apparatuses which perform one or more operations or one or more combinations of operations described herein, including data processing systems which perform these methods and computer readable media which when executed on data processing systems cause the systems to perform these methods, the operations, or combinations of operations, including non-routine and unconventional operations.

Turning now to the drawings, systems and methods, including non-routine or unconventional components or operations, or combinations of such components or operations, for training an AI using variable input data in accordance with embodiments of the invention are illustrated. In many embodiments, and shown in FIG. 1A, is an AI variable input data training system 100, which is referred to herein as the 'AI training system' 100. The AI training system 100 includes an AI training user device 102 (referred to herein as 'user device'), and may also include a network 150 and an AI training database 130. In accordance with an embodiment, the user device 102 and the database 130 may be coupled in networked communication via a network 150 (e.g., a cellular network, a Wi-Fi network, the Internet, and so forth). In some embodiments, the user device 102 is a mobile computing device, such as a smartphone or a tablet computer. In other embodiments, the user device 102 is a computing device such as a desktop computer.

Figure 1B:
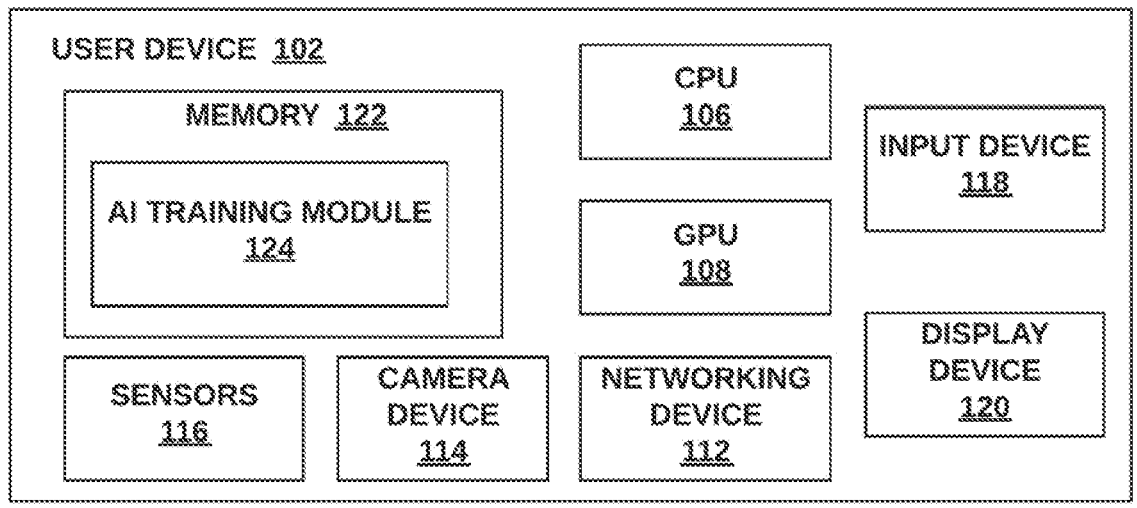
FIG. 1B is a schematic illustrating a user device within an AI training system, in accordance with one embodiment.

In accordance with an embodiment, and shown in FIG. 1B, the user device 102 includes one or more central processing units (CPUs) 106, and graphics processing units (GPUs) 108. The user device 102 also includes one or more networking devices 112 (e.g., wired or wireless network adapters) for communicating across the network 150. The user device 102 further includes one or more camera devices 114 which may be configured to capture digital video of the real world near the user device 102 during operation. The user device 102 may also include one or more sensors 116, such as a global positioning system (GPS) receiver (e.g., for determining a GPS location of the user device 102), biometric sensors (e.g., for capturing biometric data of a user of the user device 102), motion or position sensors (e.g., for capturing position data of a user of the user device 102 or other objects), or an audio microphone (e.g., for capturing sound data). Some sensors 116 may be external to the user device 102, and may be configured to wirelessly communicate with the user device 102 (e.g., such as used in the Microsoft Kinect, Vive Tracker™, MIT's Lidar sensor, or MIT's wireless emotion detector).

The user device 102 also includes one or more input devices 118 such as, for example, a keyboard or keypad, mouse, pointing device, touchscreen, or hand-held device (e.g., hand motion tracking device), and the like, for inputting information in the form of a data signal readable by the processing device 106. The user device 102 further includes one or more display devices 120, such as a touchscreen of a tablet or smartphone, or lenses or visor of a VR or AR HMD, which may be configured to display virtual objects to a user of the user device 102 in conjunction with a real world view.

The processing device 106 may be any type of processor or processor assembly comprising multiple processing elements (not shown), having access to a memory to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIG. 2).

The user device 102 also includes a memory 122 configured to store an AI training module 124. The memory 122 can be any type of memory device, such as random access memory, read-only or rewritable memory, internal processor caches, and the like.

In accordance with an embodiment, during operation, the AI training system 100 is a tool that provides (e.g., using the method 200) an ability to easily group and modify training input data for training of one or more AI systems. In accordance with an embodiment, the tool may be implemented within a computer user interface. In accordance with an embodiment, and via the method 200 (e.g., described below with respect to FIG. 2), the AI training system 100 (e.g., as implemented within a user interface) allows an end user to easily categorize data in order to train one or more AI systems with various combinations of the categorized data. For example, a training data set to create rooms might include a large number of photos, models, animations, and videos related to a variety of rooms (e.g., including objects therein) that could be divided by the AI training system 100 into categories as described within the method 200 (e.g., contemporary chairs, modern tables, antique lamps, and the like). Based on a task being a creation of a room with guidelines for a desired layout, furniture, and design, an output from the AI training system 100 trained for the task would include a plurality of different rooms (e.g., or room schemas) wherein the different rooms included the following: a) results based on all training data from the training data set, b) results using training data wherein one category of the data is removed from the training data set (e.g., producing a plurality of results including a result for each of the data-set categories removed), and c) a series of alternative results wherein any number of the training data categories is removed, and/or with specified category data-sets more highly weighted.

Figure 2:
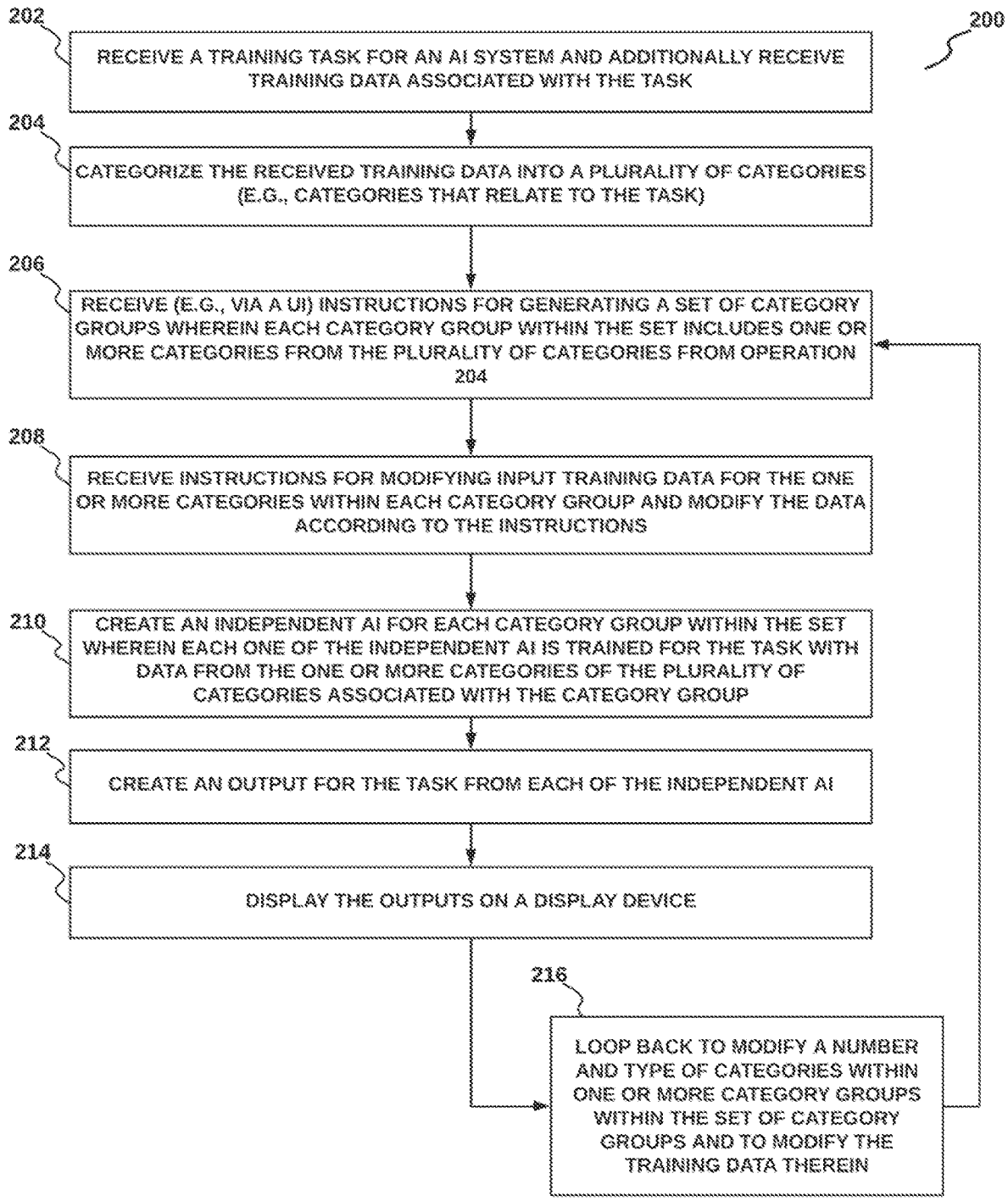
FIG. 2 is a flowchart of an AI training method, in accordance with one embodiment.

In accordance with an embodiment, and shown in FIG. 2 is a method 200 for training one or more AI systems (e.g., AI models, AI agent, and the like), wherein the method 200 uses variable input data for the training. The method 200 may be used in conjunction with the AI training system 100 as described with respect to FIG. 1A and FIG. 1B. In various embodiments, some of the method operations shown may be performed concurrently, in a different order than shown, or may be omitted. In accordance with an embodiment, at operation 202 of the method 200, the AI training module 124 receives a training task for an AI system and may also receive training data associated with the task. The task is a purpose or goal for which the AI training system 100 trains the AI system to achieve, and may include a description of a specific type of output of the AI system. The task can include almost any goal or purpose, including performing classification, problem solving, creation of virtual objects, and more. The examples provided for the task are for ease of explanation only and should not be taken as limiting in any way. In accordance with an embodiment, the task may be provided to the AI training system via a user interface. In accordance with an embodiment, the received training data is associated with the task. For example, based on the task being related to an AI system choosing furniture for a room, the training data may contain images or models of furniture and rooms that include furniture.

In accordance with an embodiment, at operation 204, the AI training module 124 sorts the training data (e.g., received during operation 202) into a plurality of categories. The categories may be related to the task. In accordance with an embodiment, the AI training module 124 may perform the categorization with an additional AI classification system (e.g., an additional fully trained AI categorization system). The additional AI classification system may be an AI system that has been trained to classify and create groups within the received training data based on an analysis of the received training data. In accordance with an embodiment, the categorization may be done manually (e.g., by a specialist in the task).

In accordance with an embodiment, at operation 206 of the method 200, the AI training module 124 receives (e.g., via a user interface) instructions for generating a set of category groups wherein each category group within the set includes one or more categories from the plurality of categories from operation 204. For example, the AI training module 124 may create and display an interactive UI whereby a user may select the set of category groups. In accordance with an embodiment, the instructions may be generated by and received from a human operator observing a displayed output (e.g., from operation 214). In accordance with another embodiment, the instructions may be generated by and received from an AI agent observing output generated in operation 212 or operation 214, wherein the AI agent has been previously trained (e.g., by observing a human operator using imitation learning or by other AI training methods) to generate a set of category groups based on the observed output.

In accordance with an embodiment, at operation 208 of the method 200, the AI training module 124 receives instructions (e.g., via a user interface or from an additional AI agent) for modifying input training data for the one or more categories within each category group, and performs a modification of the data according to the instructions. For example, the instructions may include one or more weighting values and instruct the AI training module 124 to apply a weighting to data within a category such that data within the category is used in the training according to the weighting. As a specific example, the weighting may apply to data augmentation during training such that data augmentation techniques are applied to each category according to a weight (e.g., a weighting value) assigned to the category (e.g., a first category may use a different amount of data augmentation relative to a second category based on the first category and the second category having different assigned weighting values). In accordance with an embodiment, the instructions may be generated by a human operator observing displayed output (e.g., from operation 214) corresponding to one or more AI systems trained for the received task wherein the one or more AI systems are trained using the set of category groups as discussed below in operation 210. In accordance with another embodiment, the instructions may be generated by an additional AI system observing displayed output (e.g., from operation 212) corresponding to one or more AI systems trained for the received task wherein the one or more AI systems are trained using the set of category groups as discussed below in operation 210, and wherein the additional AI system has been trained (e.g., by observing a human operator using imitation learning or by other AI training methods) to generate the instructions based on a comparison of the observing of the displayed output.

In accordance with an embodiment, at operation 210, a plurality of AI systems/models are created wherein each one AI system/model of the plurality of AI systems/models is trained with a different subset of data taken from the received and categorized training data (e.g., output from operation 204). For example, a first AI system/model would be trained with a first subset of data, a second AI system/model would be trained with a second subset of data (different from the first set of data), a third AI system/model would be trained with a third subset of data (different from the first set of data and the second set of data), and so on. In accordance with an embodiment, during operation 210, the plurality of AI systems/models are trained for the received training task (e.g., received during operation 202). In accordance with an embodiment, as part of operation 210, the plurality of created AI systems/models includes an AI system/model for each separate category group within the set of category groups (e.g., wherein the set is determined as part of operation 206). For example, and in accordance with an embodiment, an AI system/model created for a first category group of the set is trained with data from categories within the first category group, and an AI system/model created for a second category group of the set is trained with data from categories within the second category group. For example, based on operation 206 generating 'N' number of category groups within the set, there would be N number of different AI systems/models generated in operation 210.

In accordance with an embodiment, as part of operation 212 of the method 200, each created and trained AI system/model from operation 210 is used by the AI training module 124 to generate an output for the received task. For example, if the received task is to select (e.g., or generate) a digital object representing a chair for a digital object representing a specified room, then each of the created and trained AI systems/models would select (or generate) a chair based on training it underwent in operation 210 using the associated subset of training data.

In accordance with an embodiment, as part of operation 214 of the method 200, an output from each of the created and trained AI system/model is displayed (e.g., within a user interface) by the AI training module 124 on a display device 120. In accordance with an embodiment, as part of operation 214, each output may be displayed in association with data (e.g., a label for the data) associated with an AI system/model which generated the displayed output. For example, the AI training module 124 may display a label for each category within a category group associated with an AI system/model which generated a displayed output.

In accordance with an embodiment, at operation 216, the AI training module 124 may loop back to operation 206 in order to modify a type and number of categories within one or more category groups within the set of category groups, to modify the training data therein, retrain the AI systems/models, and generate new outputs for the received task. In accordance with an embodiment, as part of the loop started by operation 216, one or more of the following may be done to modify input training data for an AI system/model of the plurality of AI systems/models (e.g., via operation 206 and operation 208): remove one or more categories within a category group associated with the AI system/model; add one or more categories within a category group associated with the AI system/model; and put a weight on one of more of the categories within a category group associated with the AI system/model. In accordance with an embodiment, the looping provided by operation 216 may allow for one or more AI systems/models to be removed prior to beginning a new loop (e.g., this may be achieved with a weight of zero for all categories within a category group associated with an AI system/model). In accordance with an embodiment, the method 200 loops through operations 206 through 216 until a user (e.g., human) is satisfied with an output and terminates the loop (or until a metric threshold is reached). In accordance with an embodiment, as part of operation 216, control of the looping may be performed by a software module (e.g., artificial intelligence agent).

There may be a mistrust of black box solutions when using AI to perform a task, and many users might prefer greater insights into factors (e.g., training data and training methods) that result in a particular AI training outcome. The method 200 shown in FIG. 2, and in particular the loop from operation 206 to through to operation 216 (e.g., including operations 208, 210, 212, and 214), provides a user with direct control over an output from an AI by providing a method to modify training data for the AI. In particular, operations 212 and 214 provides a display of AI output linked to a particular training data input, and operations 206 and 208 provide a method for modifying the training data input which is then used to retrain an AI and re-display a new output based on the modified training data (e.g., as the method loops from operation 216 back to operation 206 using retrained AIs).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 3:
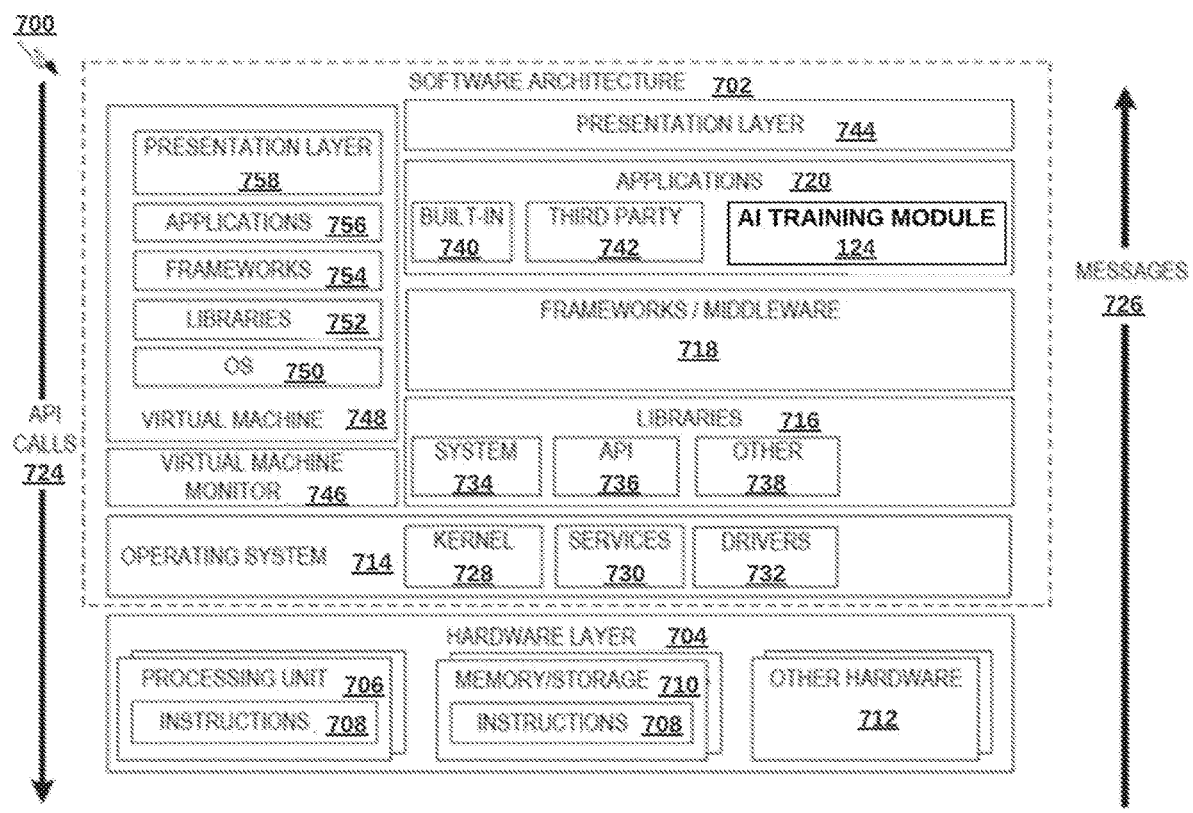
FIG. 3 is a block diagram illustrating an example software architecture, which may be used in conjunction with various hardware architectures described herein.

FIG. 3 is a block diagram 700 illustrating an example software architecture 702, which may be used in conjunction with various hardware architectures herein described to provide components of the AI training system 100. FIG. 3 is a non-limiting example of a software architecture and it will be appreciated that many other architectures may be implemented to facilitate the functionality described herein. The software architecture 702 may execute on hardware such as a machine 800 of FIG. 4 that includes, among other things, processors 810, memory 830, and input/output (I/O) components 850. A representative hardware layer 704 is illustrated and can represent, for example, the machine 800 of FIG. 4. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 3, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third party applications may include the AI training module 124. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 3, this is illustrated by a virtual machine 748. The virtual machine 748 creates a software environment where applications/modules can execute as if they were executing on a hardware machine (such as the machine 800 of FIG. 4, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 4:
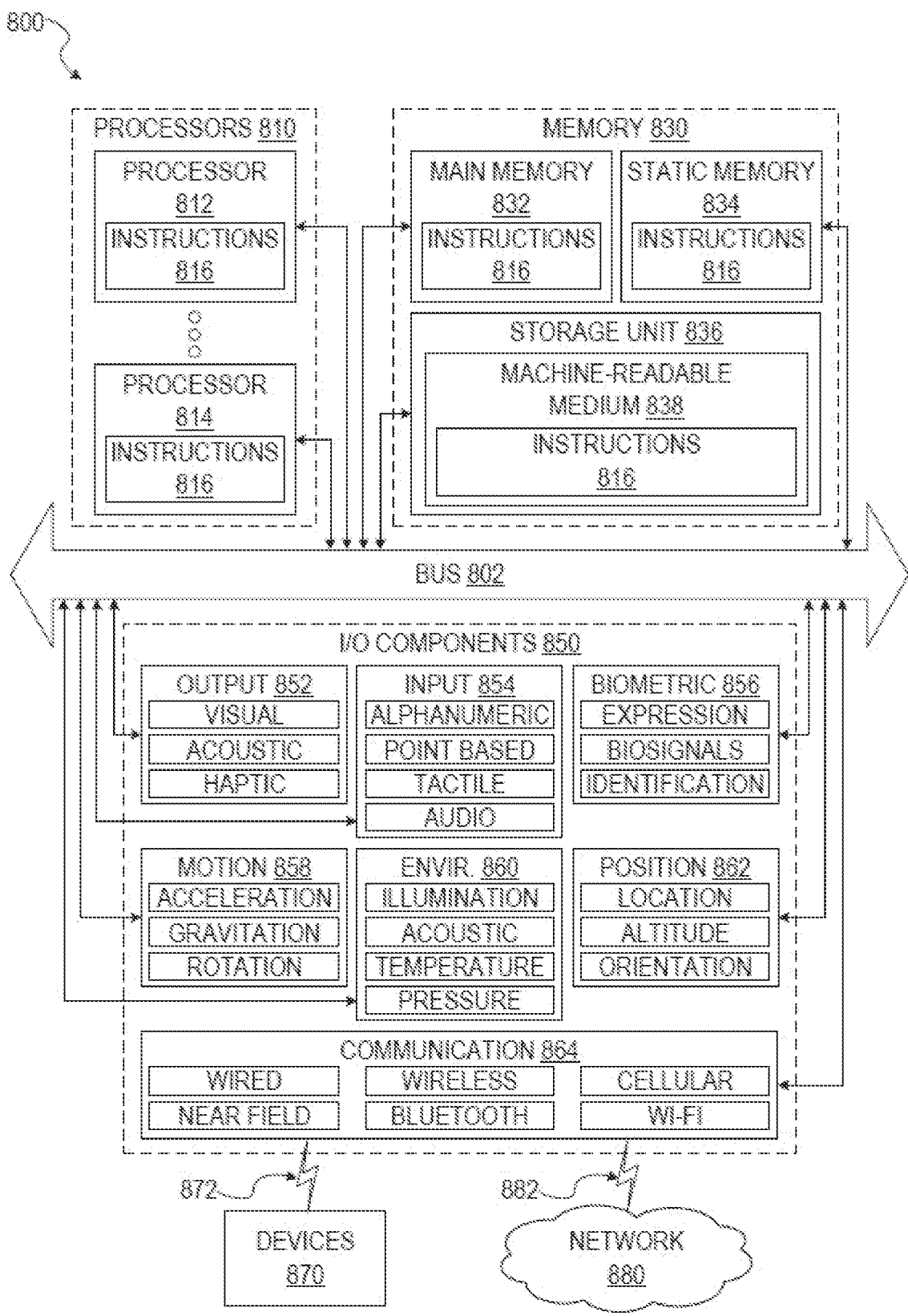
FIG. 4 is a block diagram illustrating components of a machine, according to some example embodiments, configured to read instructions from a machine-readable medium (e.g., a machine-readable storage medium) and perform any one or more of the methodologies discussed herein.

FIG. 4 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 4 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 4 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 4. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising: one or more computer processors; one or more computer memories; a set of instructions incorporated into the one or more computer memories, the set of instructions configuring the one or more computer processors to perform operations comprising: receiving training data associated with a training task; categorizing the training data into a plurality of categories; generating a set of category groups, each category group of the set of category groups including one or more of the plurality of categories; training a first artificial intelligence (AI) system for the training task, the training of the first AI system including using a first subset of the training data, the first subset of the training data corresponding to a set of the one or more of the plurality of categories included in a first category group of the set of category groups; training a second AI system for the training task, the training of the second AI system including using a second subset of the training data, the second subset of the training data corresponding to a set of the one or more of the plurality of categories included in a second category group of the set of category groups; using the first AI system to generate a first output for the training task and using the second AI system to generate a second output for the training task; modifying the training data according to an instruction specific to the first category group and an instruction specific to the second category group, wherein the instruction specific to the first category group and the instruction specific to the second category group are generated based on a comparison of the first output and the second output, wherein the modifying of the training data includes looping back to modify a type and a number of category groups in the set of category groups; retraining the first AI system or the second AI system based on the modifying of the training data; and using the first AI system to generate a third output for the training task based on the modified data and using the second AI system to generate a fourth output for the training task based on the modified data.

2. The system of claim 1, wherein the categorizing is performed using an additional AI system, the additional AI system having been trained to classify the received training data based on an analysis of the received training data.

3. The system of claim 1, wherein the instruction specific to the first category group includes applying a first weighting to a first portion of the training data during a training of an AI system that includes the first category group such that data within the first portion is used in the training according to the first weighting, the first portion corresponding to the first category group, and the instruction specific to the second category includes applying a second weighting to a second portion of the training data during a training of an AI system that includes the second category group such that data within the second portion is used in the training according to the second weighting, the second portion of the training data corresponding to the second category group.

4. The system of claim 1, the operations further comprising modifying the plurality of categories, wherein the modifying of the plurality of categories is based on a comparison of the first output and the second output.

5. The system of claim 4, the operations further comprising retraining the first AI system or the second AI system based on the modified training data or the modified plurality of categories.

6. The system of claim 5, the operations further comprising removing the first AI system or the second AI system by setting weighting values for the set of the one or more of the plurality of categories included in the first category group or the set of the one or more of the plurality of categories included in the second category group to zero.

7. A method comprising: categorizing the training data into a plurality of categories; generating a set of category groups, each category group of the set of category groups including one or more of the plurality of categories; training a first artificial intelligence (AI) system for the training task, the training of the first AI system including using a first subset of the training data, the first subset of the training data corresponding to a set of the one or more of the plurality of categories included in a first category group of the set of category groups; training a second AI system for the training task, the training of the second AI system including using a second subset of the training data, the second subset of the training data corresponding to a set of the one or more of the plurality of categories included in a second category group of the set of category groups; using the first AI system to generate a first output for the training task and using the second AI system to generate a second output for the training task; and modifying the training data according to an instruction specific to the first category group and an instruction specific to the second category group, wherein the instruction specific to the first category group and the instruction specific to the second category group are generated based on a comparison of the first output and the second output, wherein the modifying of the training data includes looping back to modify a type and a number of category groups in the set of category groups; retraining the first AI system or the second AI system based on the modifying of the training data; and using the first AI system to generate a third output for the training task based on the modified data and using the second AI system to generate a fourth output for the training task based on the modified data.

8. The method of claim 7, wherein the categorizing is performed using an additional AI system, the additional AI system having been trained to classify the received training data based on an analysis of the received training data.

9. The method of claim 7, wherein the instruction specific to the first category group includes applying a first weighting to a first portion of the training data during a training of an AI system that includes the first category group such that data within the first portion is used in the training according to the first weighting, the first portion corresponding to the first category group, and the instruction specific to the second category group includes applying a second weighting to a second portion of the training data during a training of an AI system that includes the second category group such that data within the second portion is used in the training according to the second weighting, the second portion of the training data corresponding to the second category group.

10. The method of claim 7, further comprising modifying the plurality of categories, wherein the modifying of the plurality of categories is based on a comparison of the first output and the second output.

11. The method of claim 10, further comprising retraining the first AI system or the second AI system based on the modified training data or the modified plurality of categories.

12. The method of claim 11, further comprising removing the first AI system or the second AI system by setting weighting values for the set of the one or more of the plurality of categories included in the first category group or the set of the one or more of the plurality of categories included in the second category group to zero.

13. A non-transitory computer-readable storage medium comprising a set of instructions that, when executed by one or more computer processors, causes the one or more computer processors to perform operations comprising: receiving training data associated with a training task; categorizing the training data into a plurality of categories; generating a set of category groups, each category group of the set of category groups including one or more of the plurality of categories; training a first artificial intelligence (AI) system for the training task, the training of the first AI system including using a first subset of the training data, the first subset of the training data corresponding to a set of the one or more of the plurality of categories included in a first category group of the set of category groups; training a second AI system for the training task, the training of the second AI system including using a second subset of the training data, the second subset of the training data corresponding to a set of the one or more of the plurality of categories included in a second category group of the set of category groups; using the first AI system to generate a first output for the training task and using the second AI system to generate a second output for the training task; modifying the training data according to an instruction specific to the first category group and an instruction specific to the second category group, wherein the instruction specific to the first category group and the instruction specific to the second category group are generated based on a comparison of the first output and the second output, wherein the modifying of the training data includes looping back to modify a type and a number of category groups in the set of category groups; retraining the first AI system or the second AI system based on the modifying of the training data; and using the first AI system to generate a third output for the training task based on the modified data and using the second AI system to generate a fourth output for the training task based on the modified data.

14. The non-transitory computer-readable storage medium of claim 13, wherein the categorizing is performed using an additional AI system, the additional AI system having been trained to classify the received training data based on an analysis of the received training data.

15. The non-transitory computer-readable storage medium of claim 13, wherein the instruction specific to the first category group includes applying a first weighting to a first portion of the training data during a training of an AI system that includes the first category group such that data within the first portion is used in the training according to the first weighting, the first portion corresponding to the first category group, and the instruction specific to the second category group includes applying a second weighting to a second portion of the training data during a training of an AI system that includes the second category group such that data within the second portion is used in the training according to the second weighting, the second portion of the training data corresponding to the second category group.

16. The non-transitory computer-readable storage medium of claim 15, the operations further comprising modifying the plurality of categories, wherein the modifying of the plurality of categories is based on a comparison of the first output and the second output.

17. The non-transitory computer-readable storage medium of claim 16, the operations further comprising retraining the first AI system or the second AI system based on the modified training data or the modified plurality of categories.

* * * * *